Aug. 16, 1966   J. CARNESECCA, JR., ET AL   3,266,534
POWER OPERATED SAWING TOOL
Filed Sept. 19, 1962
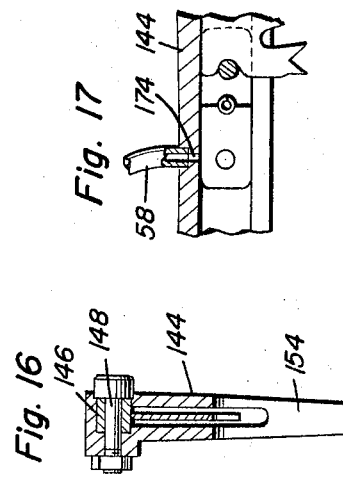
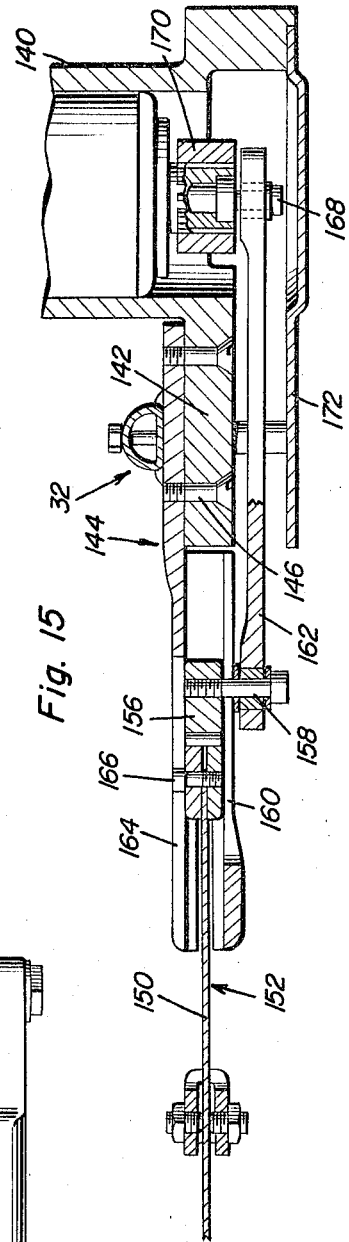
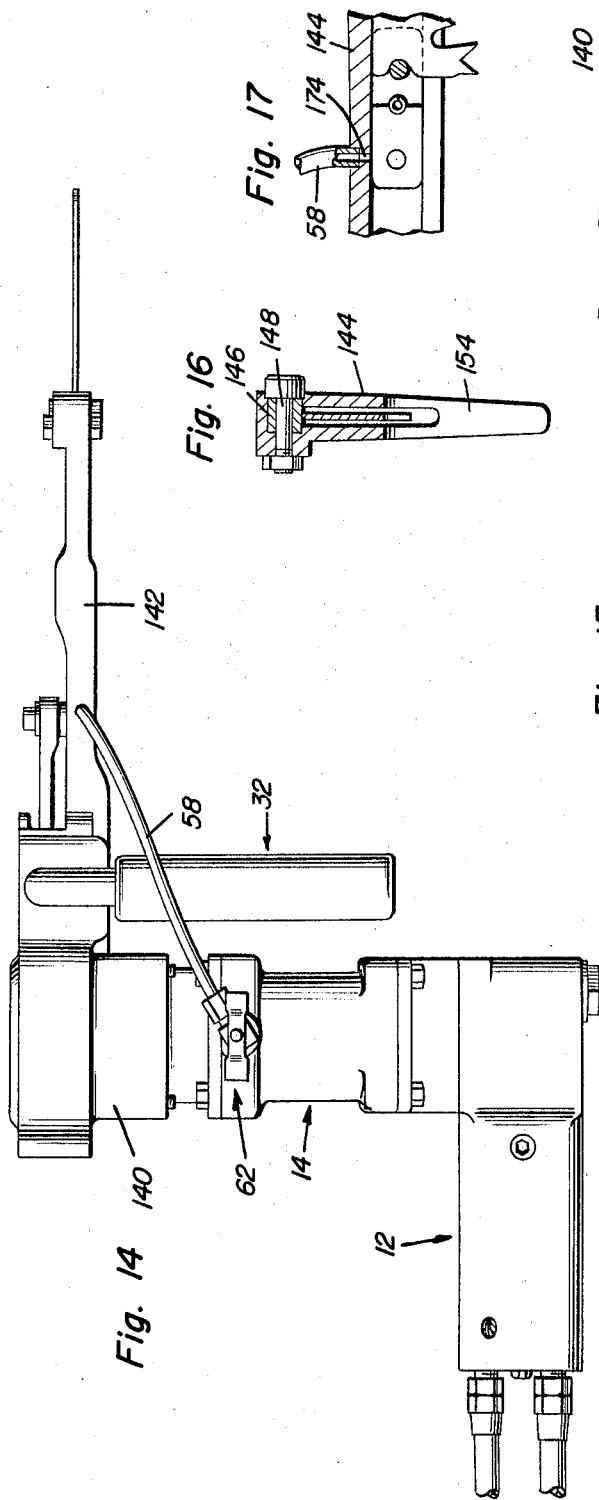
Joseph Carnesecca, Jr.
Egidio Carnesecca
INVENTORS.

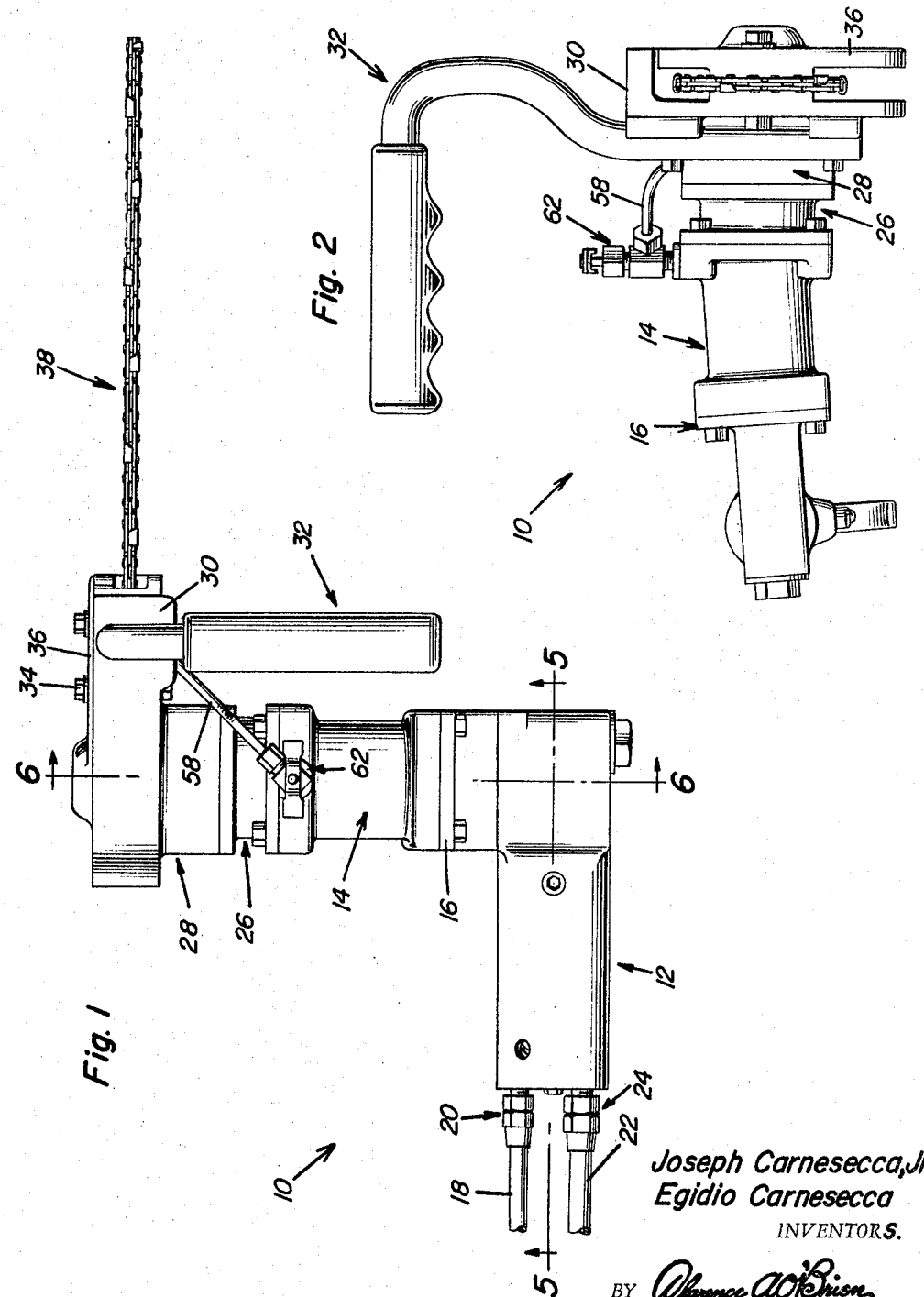

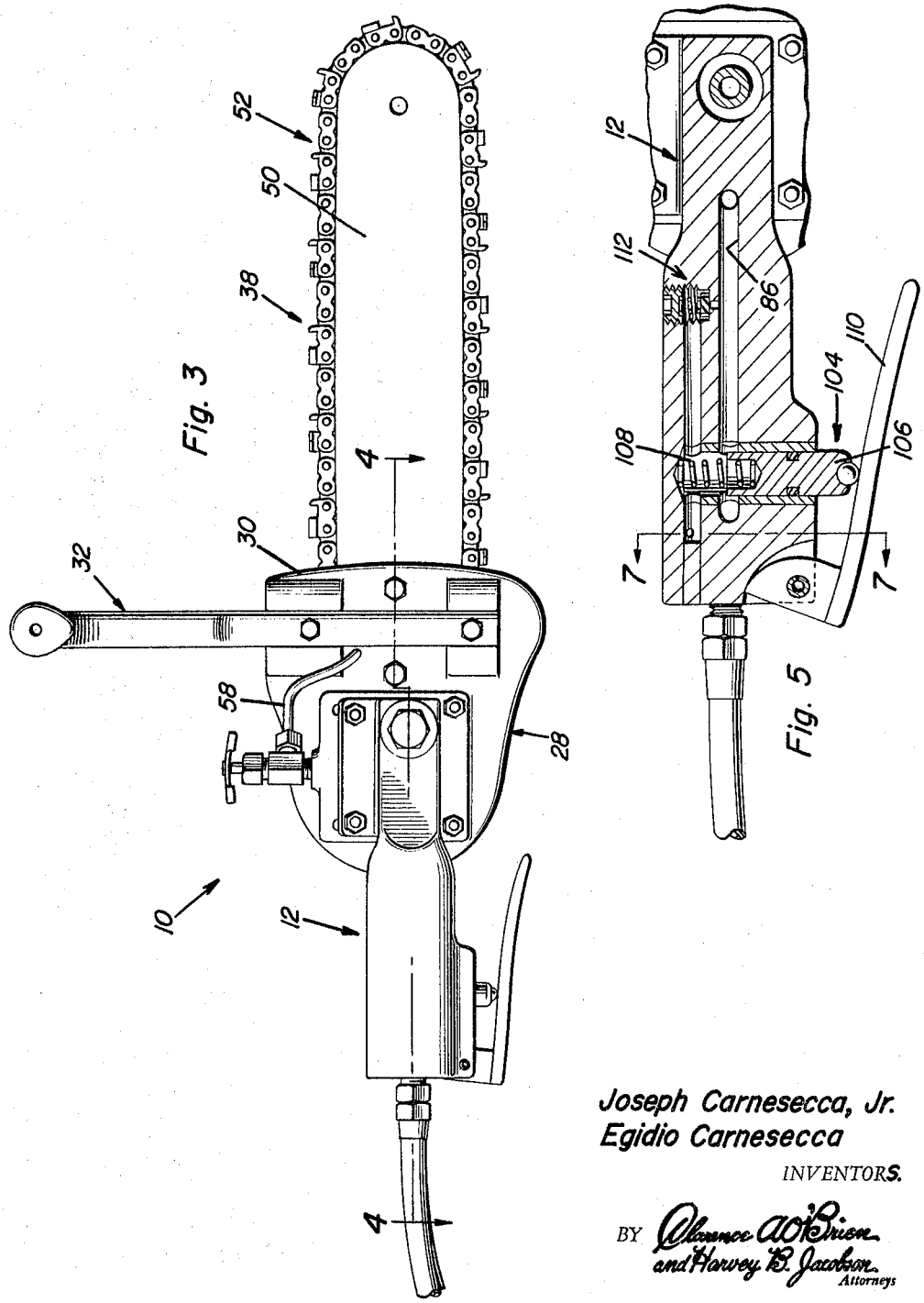

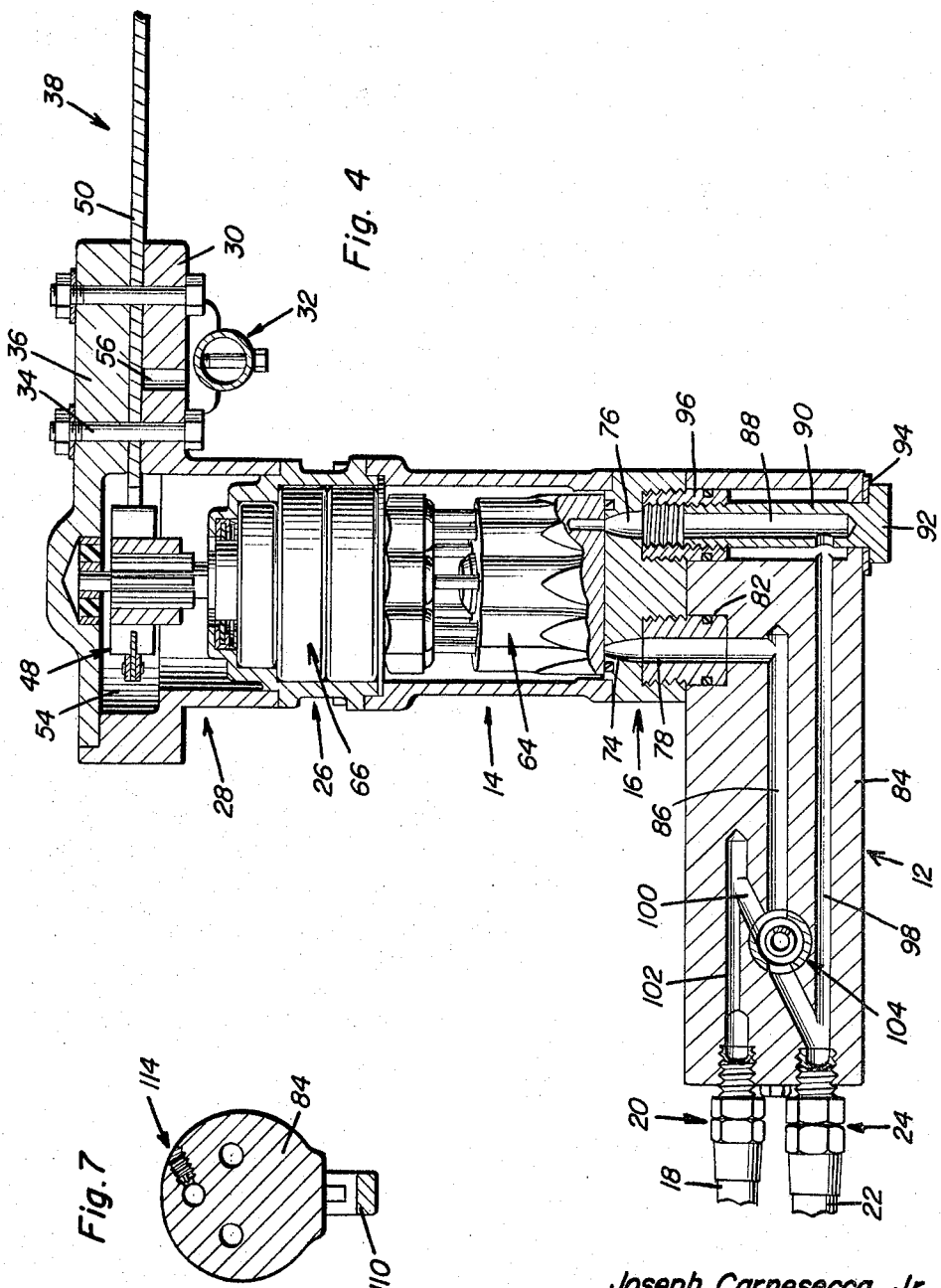

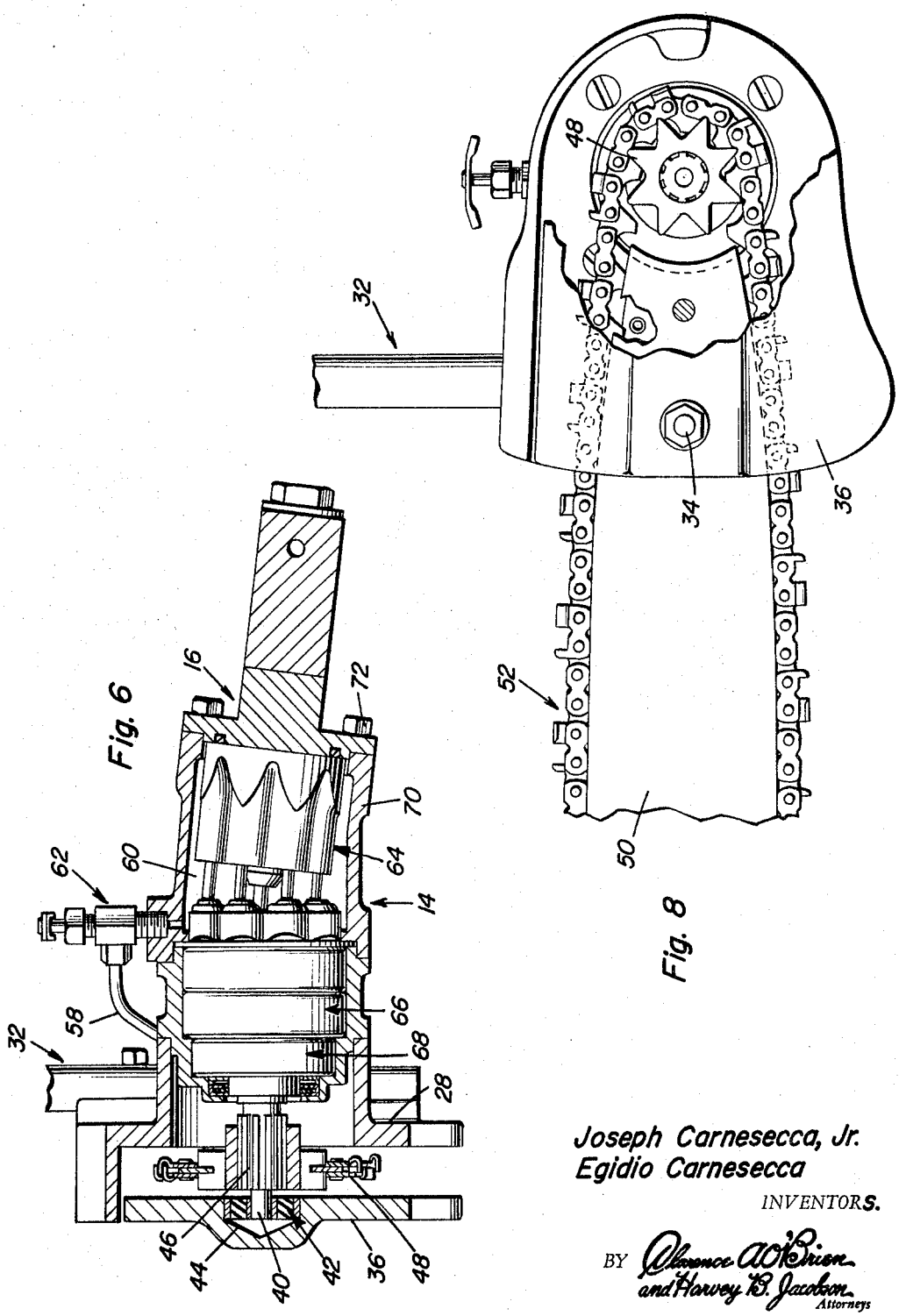

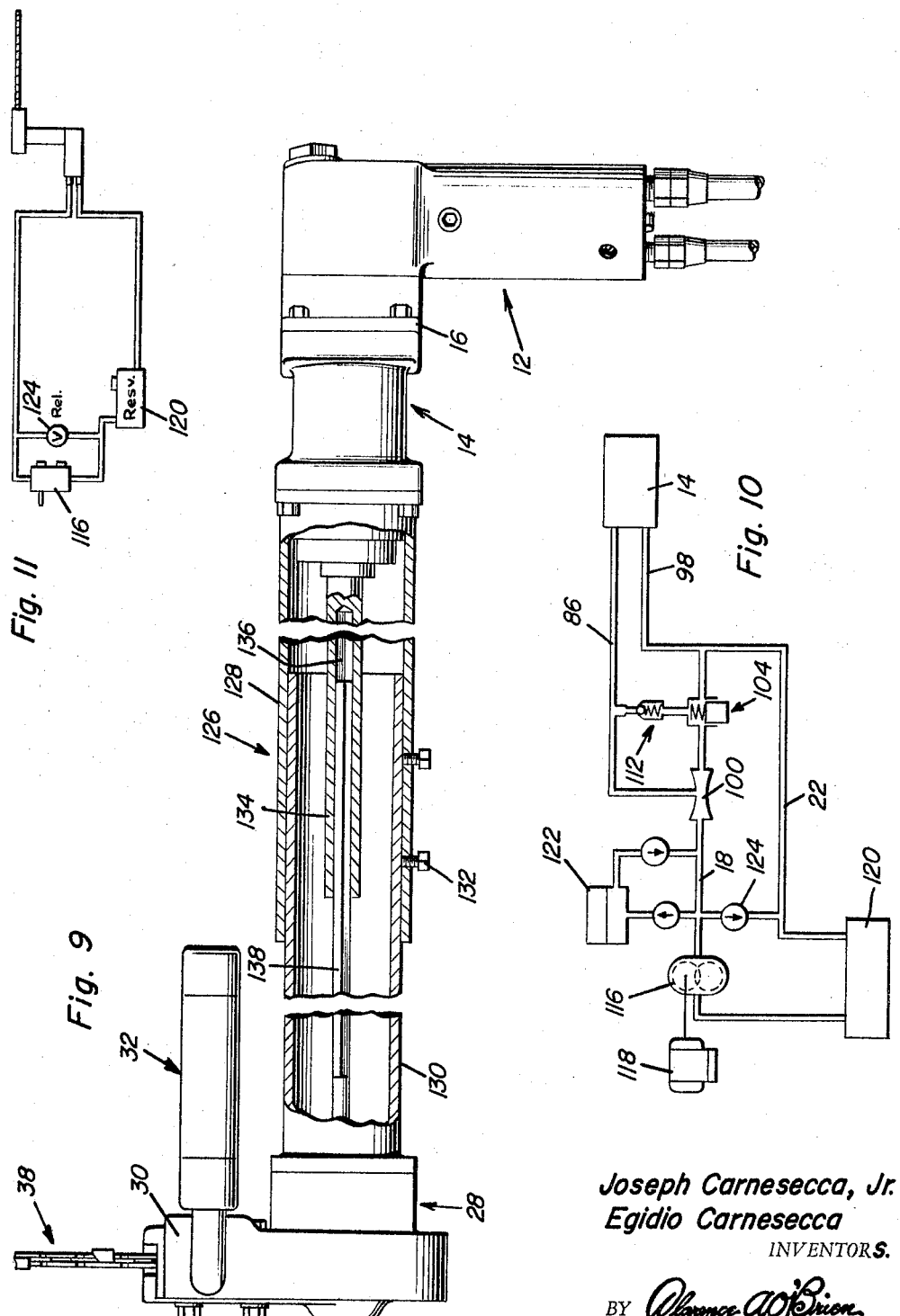

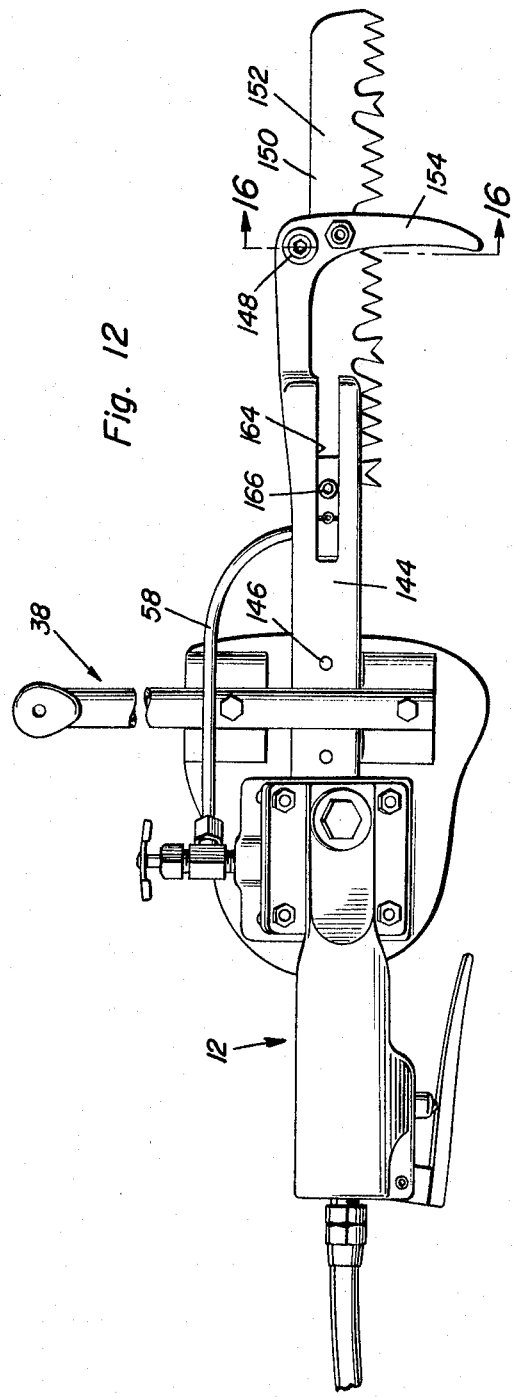
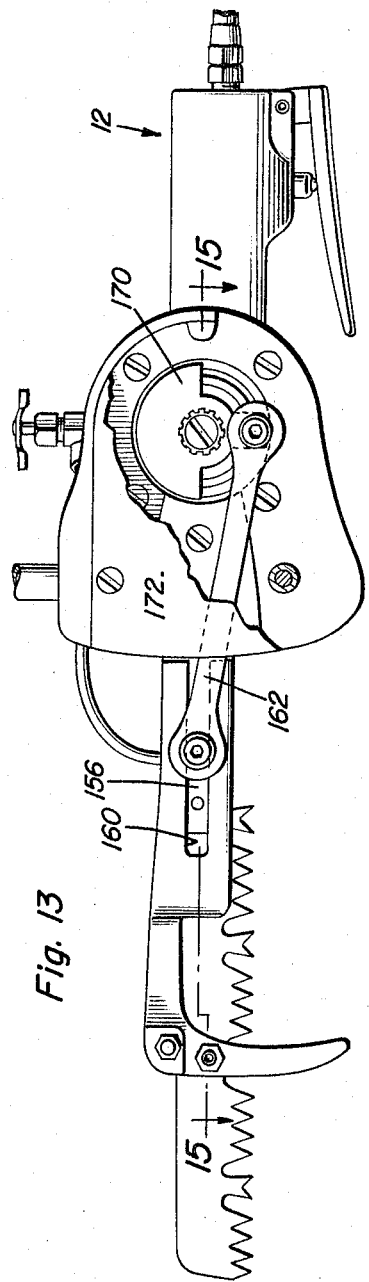

United States Patent Office 3,266,534
Patented August 16, 1966

3,266,534
POWER OPERATED SAWING TOOL
Joseph Carnesecca, Jr., and Egidio Carnesecca, Springville, Utah, assignors to New Draulics, Inc., a corporation of Utah
Filed Sept. 19, 1962, Ser. No. 224,631
5 Claims. (Cl. 143—32)

This invention relates to a power operated device and in particular, to power operated chain saws and reciprocating type of saws.

It is a primary object of the present invention to provide a hydraulically operated power saw having extremely smooth, noiseless and vibration-free operational attributes and yet capable of being manipulated and controlled with great ease and efficiency.

Another object of the present invention is to provide a power operated saw which may be easily connected to any hydraulic source of power usually available on tractors, orchard hydraulic lifts, etc.

An additional object of the present invention is to provide a hydraulically operated power saw exhibiting wide versatility in handling and positioning for use in otherwise inaccessible locations.

A still further object of the present invention is to provide a power operated saw which features an instant, no coast stop by trigger valve release, without use of complicated and expensive declutching and braking mechanism.

Yet another object of the present invention is to provide a power operated saw which features a single start and stop control with variable speed regulation.

The hydraulically operated power saw of the present invention also is endowed with a self-lubricating feature contributing to its operational efficiency and reducing maintenance costs.

As a further object of the present invention, the power operated saw or tool includes a cutter and cutter drive assembly separated from a motor and control assembly for easier cutter direction and for adjustable separation therebetween.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of one form of power operated saw in accordance with the present invention;

FIGURE 2 is a front elevational view of the power saw illustrated in FIGURE 1;

FIGURE 3 is a side elevational view of the power operated saw illustrated in FIGURE 1;

FIGURE 4 is a sectional view of the power operated saw taken substantially through a plane indicated by section line 4—4 in FIGURE 3;

FIGURE 5 is a sectional view taken substantially through a plane indicated by section line 5—5 of FIGURE 1;

FIGURE 6 is a sectional view taken substantially through a plane indicated by section line 6—6 in FIGURE 1;

FIGURE 7 is a transverse sectional view taken substantially through a plane indicated by section line 7—7 of FIGURE 3;

FIGURE 8 is an enlarged partial side elevational view of the power saw illustrated in FIGURES 1 through 7 with parts broken away;

FIGURE 9 is a top plan view of a power operated saw modified by the addition thereto of an extension assembly;

FIGURE 10 is a hydraulic circuit diagram associated with the power operated saw;

FIGURE 11 is a simplified hydraulic circuit that may also be associated with the power operated saw;

FIGURE 12 is a side elevational view of another form of power operated saw assembly;

FIGURE 13 is a side elevational view of the power operated saw illustrated in FIGURE 12 from the opposite side with a part broken away;

FIGURE 14 is a top plan view of the power operated saw illustrated in FIGURES 12 and 13;

FIGURE 15 is a transverse sectional view taken substantially through a plane indicated by section line 15—15 in FIGURE 13;

FIGURE 16 is a transverse sectional view taken substantially through a plane indicated by section line 16—16 in FIGURE 12; and FIGURE 17 is an enlarged detail sectional view taken through a plane indicated by section line 17—17 in FIGURE 14.

Referring now to the drawings in detail, it will be observed from FIGURES 1, 2, and 3, that a chain saw type of power tool is illustrated and is generally referred to by reference numeral 10. The power saw includes a control valve assembly generally referred to by reference numeral 12 which is similar to and interchangeable with the control valve assembly as disclosed in prior copending application Serial No. 203,604, filed June 19, 1962. The control valve assembly 12 in the present application, however, is connected at right angles to a positive displacement fluid motor generally referred to by reference numeral 14 by means of a coupling 16. Accordingly, a motivating fluid medium such as hydraulic fluid or oil derived from some source of fluid under pressure, is supplied to the fluid motor 14 by the inlet conduit 18 through the control valve assembly 12 to which it is connected by the fitting 20. The fluid outlet conduit 22 is therefore also connected to the control valve assembly by the fitting 24 for conducting fluid away from the motor 14 back to the fluid reservoir of a closed fluid circuit as will be explained hereafter. Connected to the fluid motor 14 by means of a connecting assembly 26, is a drive gear casing 28 which is formed with a laterally extending portion 30 with respect to the rotational axis of the motor assembly 14, to which a handle grip 32 is secured. Secured to the gear casing 28 by fasteners including bolt assemblies 34, is a guide holder member 36 which closes the open axial end of the gear casing 28 and is also disposed in confronting relation to the laterally extending portion 30 of the gear casing as more clearly seen in FIGURE 4. The gear casing 28 and the guide holder 36 thereby form a guide frame assembly for movably supporting a chain saw or cutter assembly 38.

With continuing reference to FIGURE 4 and FIGURES 5, 6 and 8, it will be observed that the output shaft 40 of the fluid motor 14 is journaled within a sleeve bearing 42 seated within a journal socket 44 formed in the guide holder 36 in axial alignment with the motor output shaft 40. The motor output shaft 40 is provided with a splined portion 46 so as to fixedly carry thereon a drive sprocket 48 within the gear housing 48. Axially aligned with the sprocket gear 48 is a guide blade 50 which is clamped between the laterally extending portion 30 of the gear casing and the guide holder 36 by means of the bolt fastener 34 as more clearly seen in FIGURE 8. The guide blade 50 is a conventional element of the chain saw assembly 38 and has entrained thereabout an endless saw chain 52 driven by the drive sprocket 48. In order to lubricate the parts within the drive chamber 54 formed between the gear casing 28 and the guide holder 36, a lubricating passage 56 is formed in the laterally extending portion 30 of the gear casing as seen in FIGURE 4 to which a lubricating conduit 58 is connected, as seen in FIGURES 3 and 6. A restricted flow of lubricating fluid is thereby supplied to the gear chamber 54 derived from leakage fluid within chamber 60 of the fluid motor 14, the chamber being connected to the lubricating conduit 58 by means of the manually controlled restriction valve 62. The power operated assembly of the present invention is thereby provided with a self-lubricating feature.

The fluid motor 14 as more clearly seen in FIGURES 4 and 6, may be of any suitable type as for example the pulsating pump and motor unit illustrated including the input section 64 mounted within the chamber 60 and the output section 66 mounted within the connecting assembly 26 provided with a sealed bearing assembly 68 to prevent flow of fluid from the output section into the gear casing. The coupling section 16 on the other hand is connected to the casing 70 for the input section 64 by means of the bolt fasteners 72, the coupling section being provided with an inlet port 74 and an outlet port 76 as more clearly seen in FIGURE 4 through which fluid is supplied and discharged from the motor assembly. The inlet port 74 is therefore in registry with the passage 78 within the fitting 80 received within a threaded socket of the coupling 16 and projecting into a sealed recess 82 of the body 84 of the control valve assembly 12. Thus, the passage 78 and the inlet port 74 are in fluid communication with a supply passage 86 formed in the valve body. The outlet port 76 is in fluid communication with a passage 88 formed within a removable plug member 90 having a head 92 bearing against a washer 94 which engages the valve body, the opposite axial end of the member 90 being externally threaded for reception within the threaded fitting 96 received within an internally threaded recess in the coupling 16. Fluid communication is thereby established between the outlet port 76 and an outlet passage 98 formed in the valve body 84.

Referring now to FIGURES 4, 5, and 7 in particular, it wil be observed that the supply passage 86 is in fluid communication with the inlet conduit 18 by means of a connecting passage 100 and inlet passage 102 with which the fitting 20 communicates. The outlet passage 98 on the other hand is in fluid communication with the outlet conduit 22 through the fitting 24 and may also be selectively connected to the connecting passage 100 through a trigger valve assembly generally referred to by reference numeral 104. The trigger valve assembly 104 and associated structure is similar in construction and operation to the trigger valve as described in the aforementioned prior copending application. Briefly, the valve assembly 104 includes the reciprocable valve element 106 biased to an open position by means of the spring 108 and actuated to a closed position for restricting flow of fluid from the inlet passage 102 to the supply passage 86, by manual pressure applied to the trigger element 110. An overload pressure developed within the supply passage 86 is also operative to open a restricted flow check valve 112 so as to supply a limited volume of fluid to displace or kick the valve element 106 to its open condition to thereby instantaneously unload the motor hydraulically connected to the supply pressure line 86. An adjustable relief valve 114 is also provided as a precaution against the development of dangerously high pressures. Also, the configuration of the connecting passage 100 intersecting the supply passage 86, is such as to develop a Venturi suction pressure in the pressure line 86 when the valve element 106 is suddenly displaced to its open position for producing unrestricted flow between the inlet passage 102 and the outlet conduit 22, in order to reverse flow temporarily in the supply passage 86 in order to instantaneously unload the fluid motor and prevent coasting. Accordingly, instantaneous unloading of the motor occurs either in response to release of the trigger element 110 or in response to the kick-out of the valve element 106 due to overload pressure developed within the supply passage 86.

Operation of the power operated chain saw 10 will be apparent from the foregoing description. Referring, however, to FIGURE 10, operation of the chain saw in connection with any suitable source of fluid under pressure in the form of a positive displacement pump 116 driven by the motor 118, may be reviewed. The pump 116 when being driven by the motor 118, will draw fluid from the reservoir 120 and discharge the fluid under pressure into the inlet line 18 which is also connected by check valve to an accumulator 122. Also associated with the source of fluid under pressure, would be a relief valve 124 arranged to bypass fluid from the discharge conduit 18 to the outlet conduit 22 for return to the fluid reservoir 120 when the pressure exceeds some predetermined maximum value. Ordinarily, a closed fluid circuit is established through the normally open valve assembly 104 because of the relatively unrestricted fluid flow from the inlet conduit 18 through the passage 100 and through the valve assembly 104 back to the return line 22. By loading this closed fluid circuit or impeding circulatory flow therethrough, to a variable extent upon closing of the valve assembly 104, fluid flow will be established through the fluid motor 14 of the power saw whereby the speed thereof may be regulated in accordance with the degree to which the trigger element 110 is depressed. Upon release of the trigger element, the normal unrestricted circulation of fluid will be reestablished so as to stop the flow of fluid routed through the motor. When the normally unrestricted fluid circuit is unloaded, the rapid flow initially occurring through the passage portion 100 produces a suction pressure within the supply passage 86 so as to more rapidly unload the motor 14 by a temporary reverse flow occurring as a result thereof. Alternatively, unloading of the fluid circuit will occur in response to an overload pressure within the supply passage 86 causing a limited displacement of fluid into the valve assembly 104 by kicking it open. It will therefore be appreciated that by a simple actuation of the trigger element 110, the operator may control the speed of the chain saw as well as to produce instantaneous stopping thereof by release of the trigger. Thus, there is no need for disengageable drive connections between the fluid motor and the driven tool and the synchronizing drive controls incident thereto. This represents a considerable advantage since the weight, size and complexity of the power tool assembly may be reduced without any sacrifice in operational control. Also, safe operation of the chain saw is assured because of the overload responsive feature 112. It will also be appreciated that the fluid motor may be connected directly to a hydraulic source of fluid pressure as shown in FIGURE 11 should it be desired to maintain the power saw operating for a prolonged period of time.

Referring now to FIGURE 9, a modification of the power operated saw assembly illustrated and described with respect to FIGURES 1 through 8 is shown. The power assembly illustrated in FIGURE 9 differs from that of FIGURES 1 through 8 in the provision of an extension adapter assembly generally referred to by reference numeral 126 by means of which the control valve assembly 12 and motor 14 may be adjustably spaced with respect to the gear casing 28 from which the saw chain 38 and handle 32 extend. This arrangement will therefore be suitable in connection with relatively inaccessible locations where space is at a premium. The extension assembly 126 therefore involves a pair of telescopic members 128 and 130 respectively connected to the motor assembly 14 and gear casing 28. Setscrew element 132 may be provided for locking the members 128 and 130 in axially adjusted positions. The motor output shaft of the motor assembly 14 has connected thereto an elongated power shaft extension 134 provided with a non-circular slide socket 136 for slidably receiving in non-rotatable relation thereto, the drive shaft 138 which is connected to the drive sprocket within the gear casing for imparting movement to the saw chain.

Referring now to FIGURES 12 through 17, a third form of power operated tool is illustrated which is similar to the power operated chain saw 10 insofar as the valve assembly 12 and the motor assembly 14 is concerned. The gear casing 140 in this latter form is similar to the gear casing 28 described with respect to the device 10 including the laterally extending portion 142 to which the handle grip assembly 32 is connected. However, the laterally extending portion 142 has secured thereto on one side in the direction in which the handle grip 32 extends, a guide assembly 144, fasteners 146 being provided for securing the guide 144 to the portion 142 as more clearly seen in FIGURE 15. The forward end of the guide 144 is provided with a roller 146 rotatably mounted on the stud 148 as more clearly seen in FIGURE 16 so as to guide the top edge 150 of the reciprocating saw blade 152. The reciprocating saw blade 152 is therefore slidably mounted within the guide 144 and projects therefrom beyond a forward abutment portion 154 of the guide 144. Connected to a rear portion of the saw blade 152 is a connector member 156 to which a connecting stud 158 is secured, said stud extending through a guide slot 160 for pivotal connection to a pitman rod 162. The opposite side of the guide 144 is provided with a guide slot 164 through which a guide head 166 connected to the connector member 176 rides, for additional spaced sliding support for the saw blade. The pitman 162 is in turn connected to a crank pin 168 which is carried on a counterbalanced crank element 170 fixed to the motor output shaft. A closure plate 172 is secured to the gear casing 140 for closing the open end thereof and is provided with an opening at one lateral end thereof through which the pitman 162 extends for imparting reciprocatory movement to the saw blade to which it is connected by the stud 158.

For the purpose of lubricating the reciprocatory drive, a lubricating passage 174 is formed in the guide member 144 as seen in FIGURE 17, to which the lubricating line 58 is connected, said lubricating line being connected to the motor chamber for supply of leakage fluid to the valve assembly 62 as described with respect to the power operated device 10. Except for the lubrication connection and the reciprocatory drive arrangement, operation and construction of the power operated device illustrated in FIGURES 12 through 17 is the same as that described with respect to the device 10 in FIGURES 1 through 8.

In view of the foregoing, operation and utility of the power operated saw device of the present invention will be apparent. It will be appreciated that the extensible assembly connection as described with respect to FIGURE 9 may be used in connection with either the chain saw type or the reciprocating saw type of power operated tool. It will be furthermore appreciated than the arrangement of parts and the novel control assembly with which it is associated enables the power operated tool to be manufactured in relatively small sizes and at reduced weights so as to render the tool more versatile, more easily handled as well as to make it more widely available because of its reduced cost.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a power operated assembly, a rotably driven tool having cutting elements, a fluid motor, torque transmitting drive means establishing a constant rotatable driving connection between the motor and the tool to continuously load the motor, a source of fluid under pressure, passage means connecting said source to the motor including inlet and outlet conduits connected to the motor for driving thereof and a by-pass passage, valve means in said by-pass passage biased to an open condition for establishing unrestricted flow of fluid between the inlet and outlet conduits by-passing the motor, selectively actuated trigger means for closing said valve means to establish a pressure differential between said conduits, and coast preventing means responsive to opening of the valve means for instantaneously reducing said pressure differential between the conduits to stop drive of the motor by the tool.

2. The combination of claim 1 including safety means responsive to development of an excessive pressure in the inlet conduit for abruptly opening the valve means.

3. The combination of claim 2 including lubricating means operatively connected between the motor and the drive means for establishing a restricted flow of lubricant to the drive means in response to energization of the motor.

4. The combination of claim 2, including extensible adapter means for drivingly connecting the motor to the drive means in adjustable spaced relation to each other.

5. The combination of claim 2 including a gear casing for enclosing the drive means and having a laterally extending portion for movable support of said tool, and a guide holder secured to said gear casing and wherein said cutting elements of the tool are mounted on a cutter chain entrained about a guide blade secured to the guide holder.

References Cited by the Examiner
UNITED STATES PATENTS

| | | | |
|---|---|---|---|
| 1,273,618 | 7/1918 | Julien et al. | 60—52 |
| 1,401,529 | 12/1921 | Fogde | 143—68 |
| 2,119,109 | 5/1938 | Magis | 91—46 |
| 2,733,738 | 2/1956 | Block | 143—32 |
| 2,777,483 | 1/1957 | Cherem | 143—32 X |
| 2,944,538 | 7/1960 | Conway et al. | 143—32 |
| 2,984,985 | 5/1961 | MacMillin | 60—52 |
| 2,990,858 | 7/1961 | Ledger | 143—32 |
| 3,099,135 | 7/1963 | Hoadley | 60—52 |

FOREIGN PATENTS 161,604   4/1921   Great Britain.

DONALD R. SCHRAN, *Primary Examiner.*